June 24, 1969     O. R. WEBER     3,451,588
METALLIC DISH-LIKE CONTAINER AND METHOD OF MAKING SAME
Filed July 14, 1967     Sheet 1 of 2
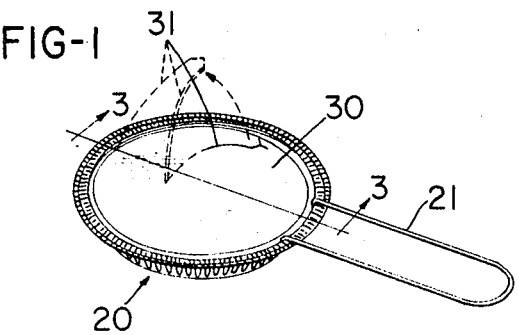
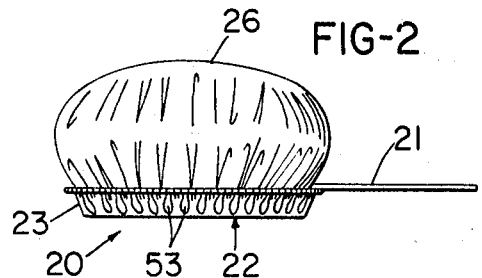
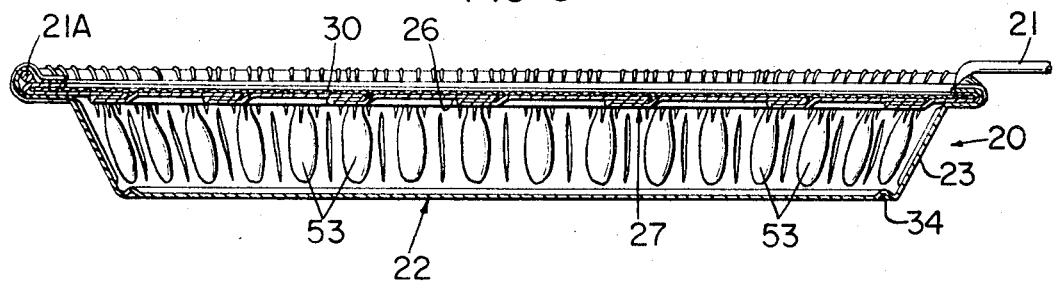
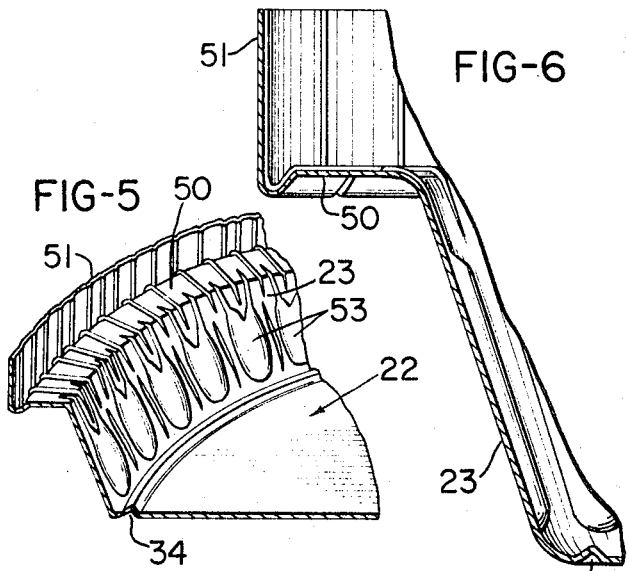
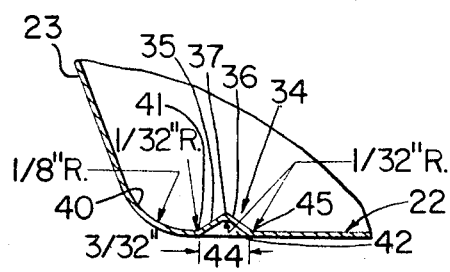
INVENTOR.
OTTO R. WEBER
BY Glenn, Palmer & Lyne
HIS ATTORNEYS

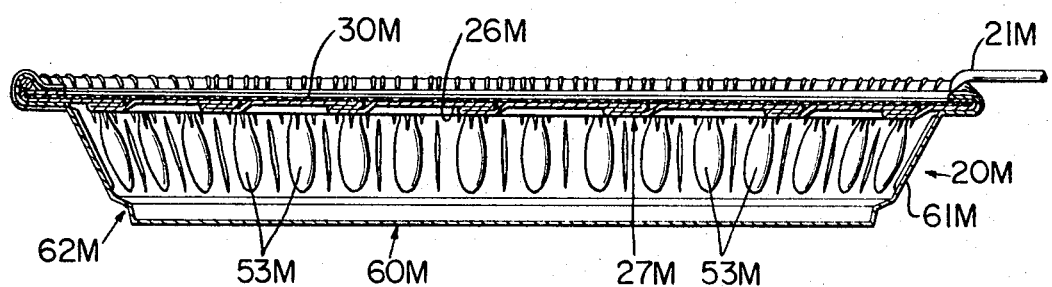
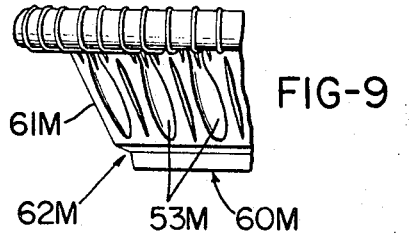
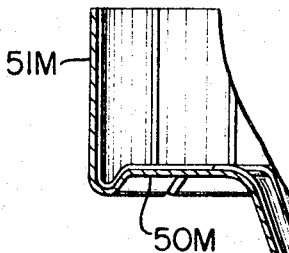
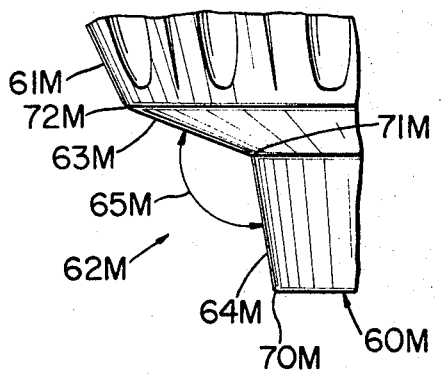
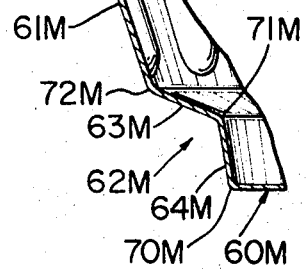

United States Patent Office 3,451,588
Patented June 24, 1969

3,451,588
METALLIC DISH-LIKE CONTAINER AND METHOD OF MAKING SAME
Otto R. Weber, Henrico County, Va., assignor to Reynolds Metals Company, Richmond, Va., a corporation of Delaware
Filed July 14, 1967, Ser. No. 653,470
Int. Cl. B65d *1/34*
U.S. Cl. 220—66      6 Claims

ABSTRACT OF THE DISCLOSURE

This disclosure relates to dish-like container such as a pan of the type particularly adapted for containing and popping popcorn therein. The pan of this disclosure has an uninterrupted planar bottom wall and side wall extending upwardly from the bottom wall and interconnected thereto by an annular portion of angular radial cross section defining an outwardly concave peripheral groove adjoining the peripheral edge of the bottom wall. The outwardly concave groove assuring that said bottom wall is smooth and free of wrinkles to thereby provide a pan which provides uniform heat distribution throughout its bottom wall.

---

This application is a continuation-in-part of application Ser. No. 582,397 filed Sept. 27, 1966.

This invention pertains to dish-like containers and more particularly to a dish-like container made from a sheet containing metal and to a method of making such container.

Many products, such as food products, are prepared for use in dish-like containers such as pans, or the like, which provide uniform heat distribution throughout bottom wall means thereof upon heating such bottom wall means to thereby assure efficient heating without wasting of such product. In some applications it is especially desirable to provide such a pan which is disposable and which may be used as a packaging container and as a pan for preparing a food product, such as popcorn for example, packaged therein.

Such a disposable pan for popping popcorn therein should also provide uniform heat distribution throughout its bottom wall for optimum heating efficiency to assure proper popping of such popcorn yet have adequate structural strength and rigidity.

Accordingly, it is a feature of this invention to provide a dish-like container which is capable of being used both as a packaging container and as a heating pan, which is of simple and economical construction, and which has a bottom wall which assures uniform heat distribution throughout its area.

Another feature of this invention is to provide such a dish-like container which is disposable in nature yet has adequate structural strength and rigidity.

Another feature of this invention is to provide a dish-like pan which can be produced at minimum cost by making such pan from an inexpensive sheet containing metal.

Another feature of this invention is to provide a dish-like container having downwardly concave peripheral grooves in its bottom wall arranged substantially contiguous to its side wall means to substantially render such bottom wall smooth and wrinkle free.

Another feature of this invention is to provide a dish-like container having an uninterrupted planar bottom wall and side wall extending upwardly from the bottom wall and interconnected thereto by an integral annular portion of angular radial cross section defining an outwardly concave peripheral groove adjoining the peripheral edge of the bottom wall to assure such bottom wall is wrinkle free.

Another feature of this invention is to provide an improved method of making an improved dish-like container of the character mentioned in a simple and economical manner.

Another feature of this invention is to provide an improved method of making such a dish-like container from a sheet containing metal.

Another feature of this invention is to provide an improved method of making a dish-like container of aluminum foil which is inexpensive to produce and has a smooth planar bottom wall free of wrinkles.

Another feature of this invention is to provide an improved method of making a dish-like container in which its side wall is formed to blend smoothly with a peripheral downwardly concave groove formed in its bottom wall substantially contigous to such side wall and defining the outer periphery of such bottom wall to thereby assure such bottom wall is smooth, free of wrinkles, and provides uniform heat distribution.

Another feature of this invention is to provide an improved method of making an expendable heating pan having a circular bottom wall providing uniform heat distribution throughout its area.

Therefore, it is an object of this invention to provide an improved dish-like container and an improved method of making such dish-like container having one or more of the novel features of this invention as set forth above or hereinafter shown or described.

Other objects, uses, and advantages of this invention are apparent from a reading of this description which proceeds with reference to the accompanying drawings forming a part thereof and wherein:

FIGURE 1 is a perspective view illustrating an improved dish-like container or pan of this invention provided with handle means and particularly adapted to be used as a container within which popcorn is stored and sold as well as a pan within which such popcorn is popped.

FIGURE 2 is a perspective view of the pan of FIGURE 1 with a portion of its handle means broken away and illustrating the manner in which an expandable cover provided in such pan has expanded to contain the popcorn after it is popped.

FIGURE 3 is a sectional view on the line 3—3 of FIGURE 1.

FIGURE 4 is a perspective view showing the dish-like container of FIGURE 1 prior to packaging popcorn therein.

FIGURE 5 is an enlarged fragmentary perspective view particularly illustrating the arrangement of groove in the peripheral edge of the bottom wall of the dish-like container of FIGURE 1.

FIGURE 6 is an enlarged fragmentary sectional view particularly illustrating the configuration of the side wall and the manner in which such side wall blends with the bottom wall of such dish-like container.

FIGURE 7 is an enlarged sectional view particularly illustrating the dimensional configuration and the manner of blending the side wall of the container of FIGURE 1 with the groove provided in its bottom wall to thereby assure that a planar bottom wall is provided which is smooth and free of wrinkles.

FIGURE 8 is a sectional view similar to FIGURE 3 showing another embodiment of the dish-like container of this invention.

FIGURE 9 is a fragmentary view in elevation of a portion of the dish-like container of FIGURE 8.

FIGURE 10 is an enlarged fragmentary sectional view similar to FIGURE 6 and particularly illustrating outwardly concave peripheral groove means providing a smooth transition between the bottom wall and side wall of the embodiment of the dish-like container of FIGURE 8.

FIGURE 11 is an enlarged fragmentary view in elevation particularly showing a present preferred dimensional ratio of surface means defining the outwardly concave groove providing a transition between the bottom wall and side wall of the dish-like container of FIGURE 8.

While the various features of this invention are hereinafter illustrated and described as being particularly adaptable for providing dish-like container such as a disposable pan for containing and popping popcorn therein, for example, it is to be understood that the various features of this invention can be utilized singly or in any combination thereof to provide disposable dish-like containers for other products and for other uses, as desired, where it is necessary to provide a dish-like container having a bottom wall which assures uniform heat distribution to the contents of such container.

Therefore, this invention is not to be limited to only the embodiments illustrated in the drawings because the drawings are merely utilized to illustrate one of the wide variety of uses of this invention.

In the exemplary embodiment of this invention illustrated in FIGURES 1–7 of the drawings an improved dish-like container shown as a dish-like container or pan 20 is illustrated. Pan 20 is made from sheet material containing metal and in this example of the invention is preferably made of expendable aluminum foil and has handle means shown as an expendable handle 21 which is suitable attached to the top portion of pan 20.

Pan 20 has improved planar bottom wall such as a bottom wall designated generally by the numeral 22 and side wall such as a side wall 23 extending upwardly from the peripheral edge of bottom wall 22 preferably at an angle so as to define an obtuse angle between the inside surfaces of bottom wall 22 and side wall 23. In this example of the invention pan 20 is particularly adapted to be used as a container within which a predetermined amount of popcorn is packaged and sold as well as a pan within which such popcorn is popped. The planar bottom wall 22 comprising pan 20 of this invention is smooth and free of wrinkles thereby assuring optimum uniform heat distribution throughout its area.

Exemplary pan 20 has an expandable top wall suitably fastened thereto and designated by the numeral 26. Top wall 26 is also preferably made of aluminum foil and expands to the configuration illustrated in FIGURE 2 of the drawings to receive the expanded volume popcorn once such popcorn has been popped by suitably heating bottom wall 22 of pan 20. In this exemplary application a suitable vegetable oil, or the like, and salt is also preferably packaged within pan 20 prior to sealing of top wall 26 in position.

The manner of folding the expandable top wall 26 is illustrated at 27 in FIGURE 3 of the drawings, and such top wall has a protective cover 30 preferably made of paperboard, or the like, which has suitable perforations 31 therein to enable severing thereof and removal in the manner shown in FIGURE 1 just prior to popping of the popcorn within pan 20.

As previously mentioned, bottom wall 22 is substantially smooth and free of wrinkles and upon being subjected to heat from either a gas or electric range, or the like, the heat therefrom is transmitted in a uniform manner throughout bottom wall 22. Such uniform heat distribution is especially important in this exemplary application to assure efficient popping of the popcorn within pan 20 without burning of the kernels of corn which might otherwise occur witth uneven heat distribution.

To render planar bottom wall 22 substantially free of wrinkles, or the like, peripheral groove shown as a peripheral groove 34 is provided in such bottom wall. Peripheral groove 34 is downwardly concave as more particularly illustrated in the drawings and is arranged substantially contiguous to side wall 23.

Groove 34 is a substantially V-shaped groove having first and second intersecting side portions or sides designated respectively by the numeral 35 and 36. Sides 35 and 36 of V-shaped groove 34 intersect on a downwardly concave substantially circular arc 37.

As seen particularly in FIGURE 7 of the drawings, side wall 23 has a base portion terminating in an upwardly concave substantially circular arc 40. Arc 40 blends smoothly with side portion 35 of V-shaped groove 34 by means of another arc 41 provided in side wall 23 and interconnecting arcuate base portion 40 with leg portion 35 of substantially V-shaped groove 34.

The substantially crcular arc 40 has a radius which is approximately four times the radius of arc 41 and, as will be apparent from FIGURE 7, metal comprising the bottom portion of side wall 23 is formed to define arc 40 and 41 and join side 35 of V-shaped groove 34 so that groove 34 in bottom wall 22 is substantially contiguous with the bottom portion of side wall 23.

V-shaped groove 34 has a depth which is approximately equal to the radius of arc 41 and such depth is illustrated at 42. The width across the open end of the V-shaped groove 34 is illustrated at 44 and is approximately three times larger than the radius of arc 41.

At the opposite side of V-shaped groove 34 its side 36 blends smoothly with planar bottom wall 22 by means of an arc illustrated at 45. Arc 45 is also substantially circular and has a radius which is approximately equal to the radius of arc 41.

Thus, as seen especially in FIGURE 7 of the drawings, the manner of blending side wall 23 with bottom wall 22 is achieved in a smooth manner and without thinning of the material defining and adjoining groove 34. The size and arrangement of the various arcs also assure that undesirable wrinkles, or the like, are not formed in bottom wall 22 during the forming of pan 20. Further, the arrangement of V-shaped groove 34 substantially contiguous with side wall 23 also effectively isolates bottom wall 22 within the area outlined by such groove and reduces the possibility of wrinkles being formed in bottom wall 22.

In this example of the invention pan 20 has its bottom wall 22 which is preferably circular in peripheral outline and V-shaped groove 34 extends around the circumference of such circular bottom wall. It will be appreciated, of course, that a pan similar to pan 20 may have a bottom wall having any desired shape while being provided with peripheral groove similar groove 34 and arranged substantially contiguous to adjoining side wall means thereof as well as being provided with smooth arcuate transistion means between its bottom wall and side wall.

Side wall 23 in this exemplary pan 20 has an outwardly projecting ledge illustrated at 50 which extends outwardly beyond top peripheral edge means of side wall 23 and has an upwardly extending substantially right circular cylindrical portion 51 provided as an integral part thereof. The upwardly extending cylindrical portion 51 is illustrated in FIGURE 6 of the drawings and such portion is bent downwardly, as illustrated in FIGURE 3, around a substantially circular inner loop 21A comprising the inner end of handle 21 to hold handle 21 and cover 30 firmly fastened in position at the top of pan 20.

As seen in the drawings, side wall 23 has a plurality of indentations provided therein a representative few of which have been designated by the numeral 53 and such indentations are formed upon forming side wall 23 in an essentially frusto-conical configuration from a flat sheet of aluminum foil. The indentations 53 provided in side wall 23 increase the structural rigidity and hoop strength of side wall 23 yet are not detrimental in the popping of the popcorn carried within pan 20 inasmuch as the prime consideration of this invention is to provide a smooth, wrinkle-free, and substantially planar bottom wall 22 in order to assure uniform heat distribution throughout the area of such bottom wall.

While the particular dimensions and configuration of any given pan, such as exemplary pan 20, are not controlling and pans may be made of any size and shape, as desired, typical dimensions will now be presented herein for pan 20 to highlight the particular dimensional ratios which make possible the forming of the planar and substantially smooth bottom wall 22 which provides uniform heat distribution throughout its area. As previously mentioned bottom wall 22 is circular in shape and side wall 23 is substantially frusto-conical.

The typical overall dimension across the top of exemplary pan 20 measuring the inside diameter of cylindrical portion 51 is 7.138 inches and the inside diameter at the top edge of the outwardly flaring portion of side wall 23 is 6⅜ inches. The slant height of side wall 23 is 15/16 of an inch and bottom wall 22 is 5 13/32 inches in diameter within its circumferential groove 34.

As shown in FIGURE 7 of the drawings, arcuate portion 40 of side wall 23 is on a radius of ⅛ of an inch while the radius between arcuate portion 40 and side 35 of V-shaped groove 34 is 1/32 of an inch. The depth of groove 34 is 1/32 of an inch, the radius of arc 37 between sides 35 and 36 is 1/32 of an inch, the width 44 of groove 34 is 3/32 of an inch, and radius 45 is also 1/32 of an inch thereby setting up dimensional ratios as previously explained enabling the blending of wall 23 smoothly with V-shaped groove 34 and with bottom wall 22.

The particular dimensions of pan 20 presented herein are merely presented by way of example and it will be appreciated that the smooth blending of a bottom wall similar to bottom wall 22 having similar peripheral groove and associated side wall can be provided in dish-like containers or pans which may be larger or smaller than pan 20, as desired, provided that in each case the dimensional ratios of the particular peripheral groove and adjoining wall are approximately in the same ratios as presented herein for exemplary pan 20.

The exemplary pan 20 described above is preferably made of a sheet containing metal and as previously mentioned is made of aluminum foil. Aluminum foil is generally considered as having a thickness of approximately .001 inch to .005 inch; however, it will be appreciated that sheet material having a thickness substantially greater than this may be employed and that the particular thickness of metal used is not controlling.

Pan 20 of this invention may be made or formed in any suitable manner. It is preferably made by utilizing suitable forming means such as die means, or the like, wherein a substantially flat sheet of aluminum foil is supported or held and formed by such die means.

One exemplary technique successfully employed to form pan 20 requires that an area of predetermined configuration be suitably clamped and held between such die means in an essentially planar and wrinkle-free manner. The configuration of the clamped area corresponds to the desired configuration of bottom wall 22 and in this example is circular. V-shaped groove 34 in bottom wall 22 and side wall 23 with its extensions at the upper peripheral portion thereof are then formed around or outwardly of clamped bottom wall 22 in one or more steps, as desired.

The various arcs 37, 40, 41, and 45 were previously described as being substantially circular arcs. It will be appreciated that such arcs need not be arcuate portions of a circle but may be similar arcs comprising portions of other geometric figures such as ellipses, parabolas, or the like, provided such similar arcs are smooth and nonabrupt in outline and are of substantially similar effective lengths and extend through similar effective angles as arcs 37, 40, 41, and 45.

Another exemplary embodiment of dish-like container or pan of this invention is illustrated in FIGURES 8 through 11 of the drawings. The pan illustrated in FIGURES 8–11 is practically identical to pan 20; therefore, such pan will be designated generally by the numeral 20M and parts of pan 20M which are identical to corresponding parts of pan 20 will be designated by the same numeral as pan 20 also followed by the letter designation M and not described again. Only those component parts which are different from corresponding parts in pan 20 will be designated by a new numeral also followed by the letter designation M and described in detail.

The main differences between dish-like container or pan 20 and pan 20M are in the structure defining the bottom wall means and side wall and as will be seen from the drawings and the following description pan 20M has an integral annular portion interconnecting its planar bottom wall to its outwardly diverging side wall.

As seen particularly in FIGURE 8 of the drawings, dish-like container of pan 20 has an uninterrupted planar bottom wall designated generally by the numeral 60M and side wall shown as a substantially frusto-conical side wall 61M extending in an upwardly and outwardly diverging manner from bottom wall 60M. An integral annular portion of angular radial cross section extends between the bottom wall 60M and the side wall 61M to provide a smooth transition therebetween while simultaneously defining outwardly concave peripheral groove designated generally by the numeral 62M and adjoining the peripheral outer edge of bottom wall 60M and the lower edge of side wall 61M. The outwardly concave groove or groove 62M assures that the bottom wall 60M is kept smooth and wrinkle free for the same reasons as were explained in detail in connection with bottom wall 22 of dish-like container or pan 20.

The integral surface means of roughly L-shaped cross-sectional configuration previously mentioned comprises a pair of intersecting leg portions designated by the numerals 63M and 64M. Leg portions 63M and 64M are of substantially equal length and for exemplary pan 20M, which has typical overall dimensions as previously specified for exemplary pan 20, leg portions 63M and 64M are each generally of the order of one-eight of an inch long.

As previously described, the peripheral groove 34 in pan 20 is provided so that it is downwardly concave; however, the peripheral groove 62M provided in pan 20M is arranged so that it is outwardly concave. In particular it will be noted that whereas concave groove 34 of pan 20 is concave downwardly from bottom all 22 it should be noted that in pan 20M perihperal groove 62M is concave outardly generally from side wall 61M.

This arragement of the peripheral groove 62M in pan 20M assures that the entire area of bottom wall 60M is provided in a continuous and uninterrupted manner while extending in one plane and any wrinkles, or the like, which might otherwise be formed in bottom wall 60M during manufacture of pan 20M are avoided by forming the transition surface means comprised of leg portions 63M and 64M and defining outwardly concave peripheral groove 62M.

Although practically any desired angular relationship may be provided between the leg portions 63M and 64M defining the integral annular portion of angular radial cross section, the preferred angular relationship between leg portions 63M and 64M is generally of the order of 120 degrees and is indicated at 65M in FIGURE 11. This 120 degree displacement between the leg portions 63M and 64M defines an optimum transition between the bottom wall 60M and side wall 61M while assuring the provision of continuous uninterrupted planar bottom wall 60M.

As seen particularly in FIGURE 11 of the drawings, the integral annular portion between the bottom wall 60M and the side wall 61M is integrally formed and provides minimum metal stress concentration during the formation or forming of the pan 20M. In particular, it will be seen that smooth radii are provided each having approximately 1/32 of an inch radius and extending between the bottom wall 60M and leg portion 64M as shown at 70M, between leg portions 63M and 64M as shown at 71M, and between leg portions 63M and side wall 61M as shown at 72M. The radii 70M–72M in addition to assuring that there is a minimum of stress concentration, further assure that the annular portion of angular radial cross section comprised of leg portions 3M and 64M has a substantially uniform thickness throughout which is substantially the same thickness as the sheet of metallic foil from which the pan 20M is made. The pan 20M thus has its bottom wall 60M which is effectively isolated beneath the frusto-conical side wall 61M and has a substantially planar uninterrupted and continuous surface.

The preferred technique used to pop popcorn in pan 20M is to rub the bottom 60M of pan 20M in a continuous back and forth motion across the heating element of a stove. The substantially continuous uninterrupted surface of bottom wall 60M assures that during such rubbing movement there will be no material weakening of the bottom wall 60M which might be caused if there were wrinkles or other interruptions in the bottom wall. In fact, rubbing movement could cause a rupture of the bottom wall as a particular wrinkle which might be present if the bottom wall is slid back and forth across the heating element.

It will be appreciated that in both dish-like containers or pans 20 and 20M the side walls 23 and 61M respectively thereof are formed without particular concern for indentations such as indentations 53 and 53M provided in side walls 23 and 61M respectively. As previously indicated such indentations are not detrimental in popping the popcorn contained within the particular pan and, in effect, enable the particular pan to be made at minimum cost since no consideration must be given in trying to accurately control the thickness or configuration of a particular side wall 23 or 61M. Further, as previously indicated the hoop strength of the side wall 23 or 61M thus provided is not decreased but may actually be increased because of this technique of forming.

The pan 20M may be formed utilizing any suitable forming means such as die means, for example, and pan 20M is preferably formed by holding a substantially flat sheet of aluminum foil firmly between a pair of die members. One presently used technique is to clamp an area defining the area of bottom wall 60M between a pair of die means in an essentially planar and wrinkle-free manner. The outwardly concave peripheral groove 62M, side wall 61M, and the extensions at the upper end portion of side wall 61M are then formed around or outwardly of the clamped bottom wall 60M in one or more sequential steps as desired.

Terms such as "downwardly," "outwardly," "upwardly," "top," "bottom," "side wall," and the like, have been used throughout this disclosure for ease of description and merely to correspond to the illustrations as presented in the drawings and such terms are not to be considered as limiting the scope of this invention in any way.

Thus, it is seen that an improved dish-like container means made from sheet material containing metal has been provided in which such dish-like container has a planar and wrinkle-free bottom wall providing substantially uniform heat distribution throughout its area.

Further, this invention provides an improved method of making such improved dish-like container, or the like.

What is claimed is:

1. A dish-like container made from a sheet containing metal and comprising, an uninterrupted planar bottom wall, a side wall extending upwardly from said bottom wall, and an integral annular portion of angular radial cross section extending between said bottom wall and side wall and defining an outwardly concave peripheral groove adjoining the peripheral edge of said bottom wall and adjoining the peripheral bottom edge of said side wall, said side wall being arranged above said peripheral bottom edge and defining the major height of said container, and the leg portions of said angular cross section defining an obtuse angle therebetween with said groove assuring said bottom wall is kept smooth and wrinkle-free.

2. A dish-like container made from a sheet containing metal and comprising, an uninterrupted planar bottom wall, a side wall extending upwardly from said bottom wall, and an integral annular portion of angular radial cross section extending between and connecting said bottom wall and the lower edge of said side wall and defining an outwardly concave peripheral groove adjoining the peripheral edge of said bottom wall, the leg portions of said angular cross section defining an obtuse angle therebetween with said groove assuring that said bottom wall is kept smooth and wrinkle-free, and said intersecting leg portions of said annular portion being of substantially equal length.

3. The container as set forth in claim 2 in which said leg portions have an included angle therebetween generally of the order of 120 degrees.

4. The container as set forth in claim 3 in which said bottom wall is circular in shape and said outwardly concave peripheral groove extends circumferentially therearound.

5. A dish-like container made from a sheet containing metal and comprising, an uninterrupted planar bottom wall, a frustoconical side wall extending upwardly from said bottom wall, and an integral annular portion of angular radial cross section extending between and connecting said bottom wall and side wall and defining an outwardly concave peripheral groove adjoining the peripheral edge of said bottom wall and adjoining the peripheral bottom edge of said side wall, said side wall being arranged above said peripheral bottom edge and defining the major height of said container, and said groove assuring that said bottom wall is kept smooth and wrinkle-free.

6. The container as set forth in claim 5 in which the angular radial cross section of said integral annular portion comprises a pair of intersecting leg portions defining an obtuse angle therebetween.

References Cited

UNITED STATES PATENTS

| 1,016,390 | 2/1912  | Beadle.         |          |
|-----------|---------|-----------------|----------|
| 1,558,235 | 10/1925 | Burton          | 220—72 X |
| 2,384,810 | 9/1945  | Calleson et al. | 220—66 X |
| 3,004,685 | 10/1961 | Hennies         | 220—72   |
| 3,021,990 | 2/1962  | Duskey.         |          |
| 3,140,034 | 7/1964  | Wyman et al.    |          |
| 3,144,974 | 8/1964  | Eichner et al.  |          |
| 3,229,886 | 1/1966  | Grogel.         |          |
| 3,250,419 | 5/1966  | O'Brien et al.  | 220—74 X |
| 3,104,776 | 9/1963  | Bostrom         | 220—72   |

FOREIGN PATENTS

| 602,743 | 6/1948 | Great Britain. |

GEORGE E. LOWRANCE, *Primary Examiner.*

JAMES R. GARRETT, *Assistant Examiner.*

U.S. Cl. X.R.

220—72, 74